UNITED STATES PATENT OFFICE.

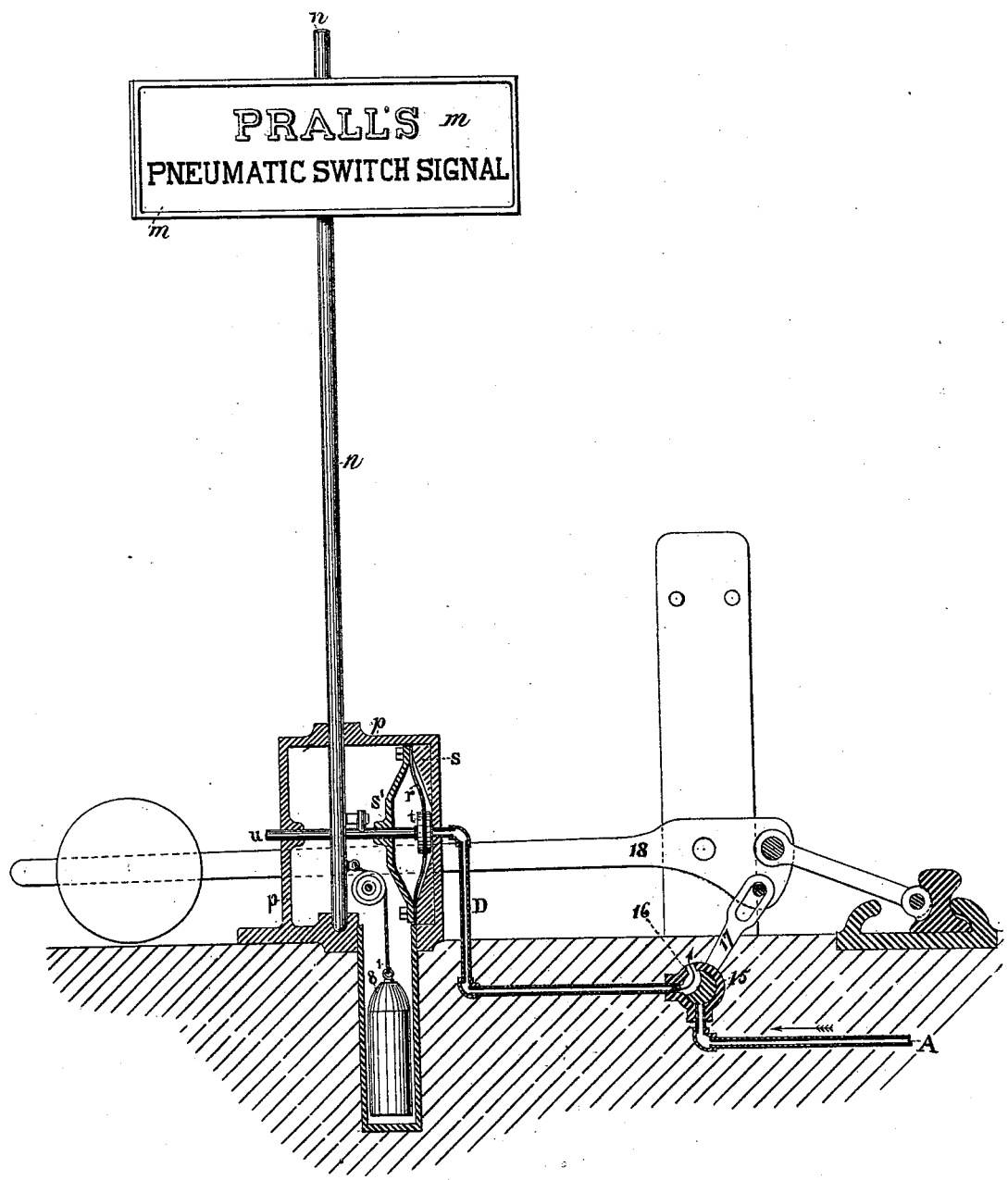

WILLIAM E. PRALL, OF WASHINGTON, D. C., ASSIGNOR TO PRALL RAILWAY-SIGNAL AND TELEGRAPH COMPANY, OF NEW YORK, N. Y.

IMPROVEMENT IN PNEUMATIC SIGNALING APPARATUS.

Specification forming part of Letters Patent No. 175,750, dated April 4, 1876; application filed January 15, 1876.

*To all whom it may concern:*

Be it known that I, WILLIAM E. PRALL, of Washington city, District of Columbia, have invented an Improved Pneumatic Railroad-Switch Signal, of which the following is a specification:

My invention has for its object the automatic display or sounding of a suitable signal by the shifting of the movable rail of a railroad-switch; and it consists in combining, with the loose switch-rail, a valve or cock to control a pipe, which shall connect a signal arranged to be operated by compressed air, with a main or reservoir charged with air under compression.

In the accompanying sectional drawing, A is a main pipe or reservoir kept constantly charged with air under compression, and D a pipe for conveying air to a suitable danger-signal to be operated thereby. 15 is a three-way cock, opening and closing communication between the pipe D and the air-main A, on the one hand, and an outward vent, 16, on the other, so that when communication is established between the air-main and the signal-pipe the outward vent shall be closed, and vice versa. 18 is the lever operating the movable rail of a railway-switch in the customary manner; and 17, a link connecting the lever with the three-way cock 15, so that when the switch is thrown open to break the main line, communication shall be established between the main A and pipe D, and vice versa. The cock, instead of being connected with the movable rail by means of the lever, operating the same as shown in the drawing, may be connected with the switch-rail in any suitable manner, so that the movement of the rail shall invariably operate to move the cock or valve, substantially in manner as illustrated, to open and close said cock or valve, and control the admission of air to a pipe, D, for operating the signal. $n$ is a rod carrying a signal-vane, and supported in suitable bearings in the top and bottom of a pedestal-box, $p$, so as to revolve freely. $S'$ is a weight attached, by a cord passing over a pulley, to a pin upon the signal-rod. $r$ is an elastic or flexible diaphragm, confined at its edges between two dished or concaved plates, $s\ s$, forming a case therefor. $t$ is a rod, secured centrally to the diaphragm by means of plates clamping the same. The diaphragm-case is secured within the pedestal-box $p$, as shown in the drawing, and the central rod $t$, projecting from the diaphragm, passes outwardly, and plays longitudinally in bearings formed in the diaphragm-case and the side of the pedestal-box. A pin upon this rod $t$, engaging a pin or short lever upon the signal-staff, will serve, when the rod $t$ moves outwardly, to impart a partial rotatory movement to the signal-rod and cause it to move a quarter-turn, so as to carry the signal-vane to a position at right angles to that which it assumes when at rest. The pipe D is made to connect and communicate with that side of the diaphragm opposite to that from which the rod $t$ projects.

In the operation of this invention, a movement of the switch-rail to break the main line of the road will move the three-way cock 15 so as to admit the compressed air in the pipe A to flow into the pipe D and actuate the diaphragm $r$. The movement of the diaphragm under air-pressure thereon will throw out the rod $t$, and thereby cause the signal-rod $n$ to turn so as to carry the vane $m$ around at right angles to the road, and thus indicate danger. This movement of the signal-rod will draw up the weight $s'$ depending therefrom. So soon, however, as the switch is returned to its first position its movement will operate to move the valve 15, and thereby cut off communication between the main A and pipe D, and simultaneously open communication between the pipe D and the exhaust-vent 16, so that it will so far reduce the pressure upon the diaphragm as that it will no longer sustain the weight $S'$, whose gravity will then operate to turn back the signal-rod and vane to its first position.

It is evident that the pipe D may be extended to any point at which it is desired to display a signal, and that an audible or sound signal, such as a whistle to be sounded by the air in pipe D may be substituted for a semaphoric or sight signal, as described.

I claim as my invention—

An air main or reservoir, A, signal air-pipe, D, and a cock or valve controlling the communication between the two, in combination with the movable rail of a railway-switch, and with a danger-signal to be operated by compressed air from the main A, substantially as and for the purpose herein set forth.

W. E. PRALL.

Witnesses:
   DAVID A. BURR,
   WM. E. KNOWLES.